Feb. 27, 1962 D'ARLE G. BASH 3,022,705

AMUSEMENT DEVICE FOR VIEWING ANIMATED PICTURES WITH SOUND ACCOMPANIMENT

Filed Sept. 8, 1955 2 Sheets-Sheet 1

INVENTOR.
D'ARLE G. BASH,
BY James N. Lyles
ATTORNEY

INVENTOR.
D'ARLE G. BASH,
BY
James W. Lyle
ATTORNEY

3,022,705
AMUSEMENT DEVICE FOR VIEWING ANIMATED PICTURES WITH SOUND ACCOMPANIMENT

D'Arle G. Bash, 1041 Venetia Ave., Coral Gables, Fla.

Filed Sept. 8, 1955, Ser. No. 533,218
2 Claims. (Cl. 88—16.2)

Figure 1:
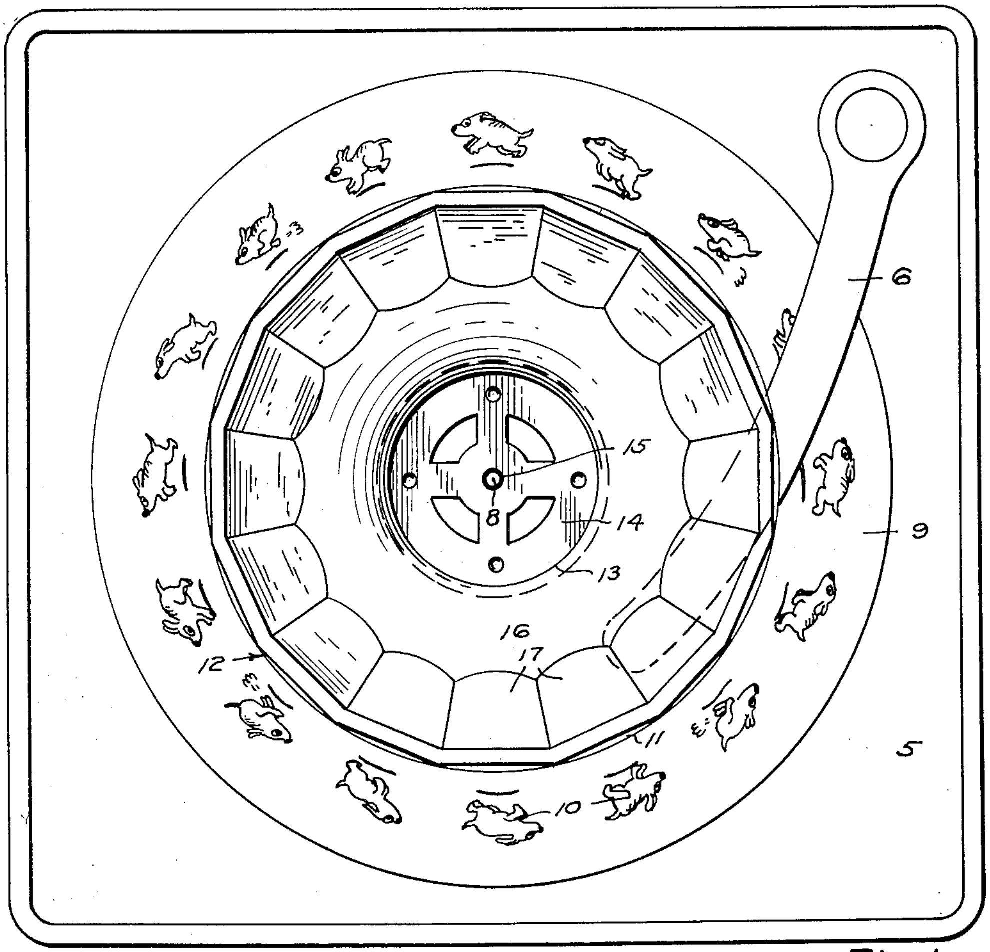

This invention relates to an amusement device in combination with a sound record and a reproducing machine.

The invention embodies broadly a reflecting device that is disposed centrally of an concentric to a rotating disk recording and wherein the disk is provided with a circumferential band of cartoons, or the like, that are reflected in the reflecting device in a manner to impart animation to the cartoons for observation by a person sitting adjacent the device, and with the cartoons representing animals, birds, trains or the like forming the audible subject matter of the recording.

The invention further embodies a reflecting device having a plurality of angularly disposed reflecting surfaces corresponding in number to the number of cartoon figures that are arranged in a circumferential manner upon the disk recording, and with the reflecting device being bodily supported upon and rotatable with the disk recording so that the various reflecting surfaces and the adjacent cartoon will be progressively moved into visual range of the viewer whereby the reflection from the disk to the reflecting surfaces of the device will in effect impart animation to the cartoons as the sound from the record is reproduced through a conventional reproducing machine.

The invention further contemplates a reflecting device having a plurality of reflecting surfaces and with the reflecting surfaces being constructed in a manner that effectively concentrates a reflected cartoon upon that reflecting surface that is in a direct line of vision of the viewer and that successfully excludes reflected cartoons in those reflecting surfaces adjacent to that reflecting surface that is in direct line of vision, thus concentrating the vision of the individual to one reflecting surface and avoiding distracting partial reflections in the adjacent surfaces.

The invention further contemplates a novel form of reflecting device that is constructed in a manner to be disposed centrally of the recording and that permits of the free and unobstructed traverse of the pick-up stylus across the record.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 2:
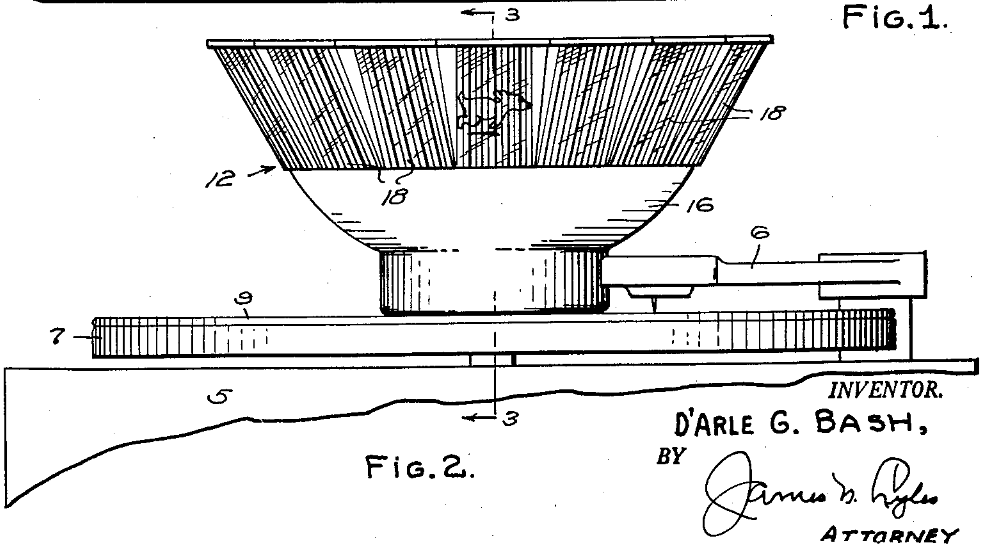
Figure 3:
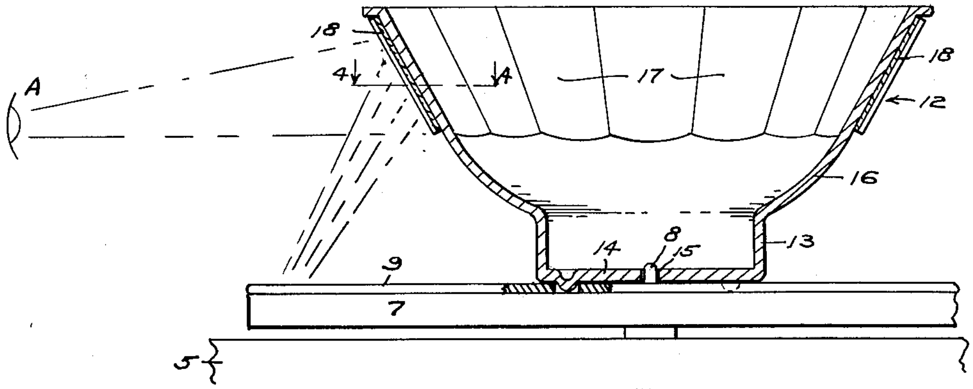
Figures 4, 5, 6:
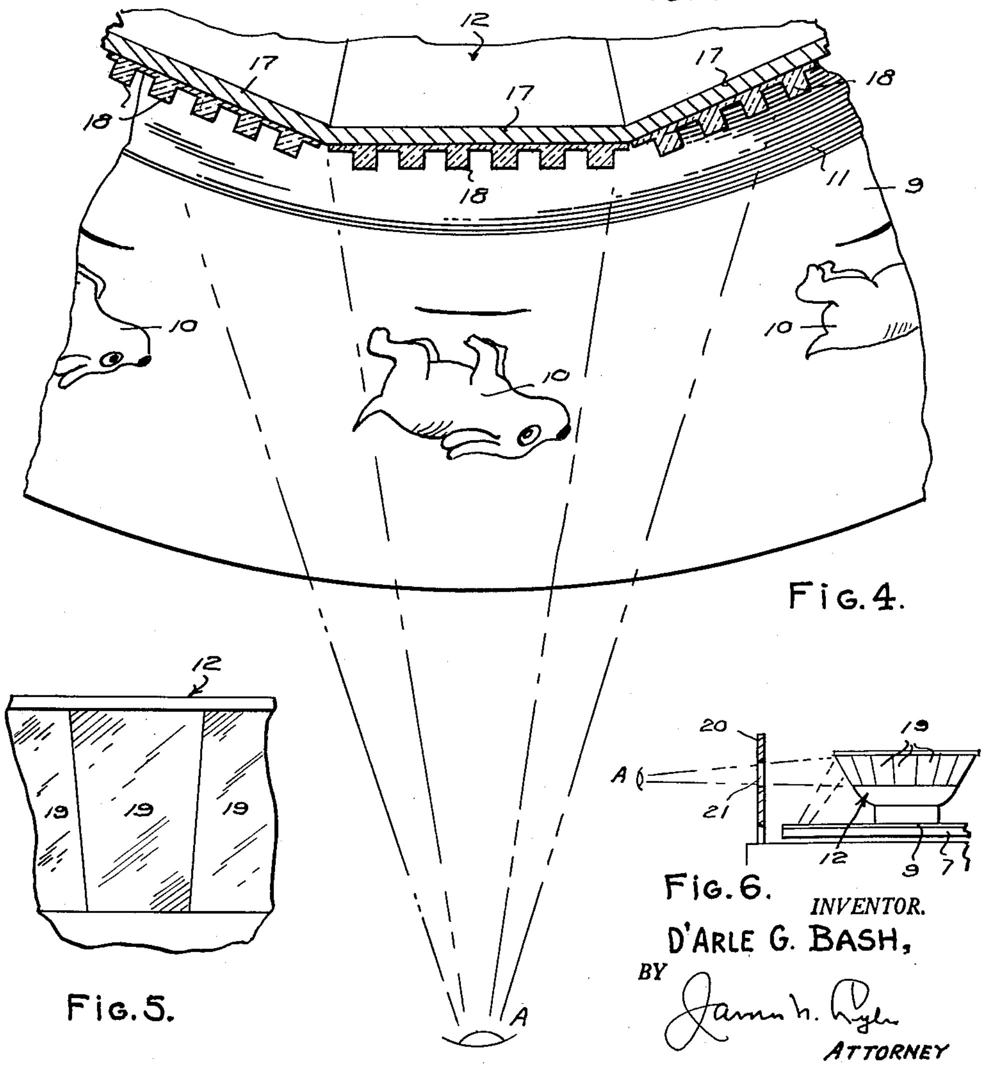

In the drawings:

FIGURE 1 is a plan view of a sound reproducing machine showing the invention applied thereto, FIGURE 2 is a side elevation of the device in use, FIGURE 3 is a vertical sectional view taken substantially on line 3—3 of FIGURE 2, parts being shown in elevation, FIGURE 4 is a fragmentary enlarged horizontal section taken substantially on line 4—4 of FIGURE 3, FIGURE 5 is a fragmentary side elevation of a slightly modified form of the invention, and FIGURE 6 is a fragmentary side elevation illustrating the use of that form of the invention illustrated in FIGURE 5 and with an apertured shield to concentrate the vision upon a single reflecting surface.

Referring specifically to the drawings, the numeral 5 designates a conventional sound reproducing device that may be either electrically or mechanically driven. The machine 5 includes the conventional stylus arm 6. The usual turn table 7 carries the centering post 8 upon which is disposed a disk recording 9 that is rotatable with the table 7 in the usual and well known manner. The disk 9 is provided with a circumferential band of cartoons 10 outwardly of the recording grooves 11. The cartoons 10 here illustrated are in the form of a running dog, there being 16 illustrations and with the illustrations being in groups of four positions of the animal. It is obvious that the particular cartoon employed corresponds to the sound effects upon the disk recording 9.

A reflecting device, illustrated as a whole by the numeral 12 comprises a cast, molded or otherwise formed bowl-like device that may be formed of plastic, aluminum or any other desirable material. The reflecting device 12 includes a cylindrical hub portion 13 having a webbed bottom portion 14 that is provided at its axial center with a cylindrical opening 15 whereby to dispose the device upon the post 8 and with the hub resting upon the surface of the disk 9 whereby the reflecting device will be bodily rotated with the disk during the playing of the record. The side walls 16 of the reflecting device terminate in upwardly and outwardly angled wall portions 17 that are formed in a plurality of flat segments corresponding in number to the several cartoons 10. The angularity of the segments have been found to be most effective when formed on an angle of approximately 60 degrees. The reflecting device 12 while being relatively light in weight, is provided with one or more protrusions in the bottom portion 14 which align with holes in the surface of the disk 9 thereby assuring proper alignment of the several flat segments with the several cartoons 10 during the rotation of the disk. Each of the segments 17 are provided upon their outer reflecting surfaces with transparent strips 18 and with the strips being of generally square form and with the several strips being parallel and equidistantly spaced apart. The strips 18 of each segment 17 are substantially identical and are arranged in a vertical manner. The purpose in so arranging the reflecting surfaces is to avoid distorting views of the cartoons within the adjacent reflecting segments as the device is being viewed from a point A and whereby the viewing of the reflected cartoon 10 is substantially concentrated in a single segment in direct line of vision from the point A. This is accomplished by using the square transparent strips as prisms so that the vision of the viewer is blocked from seeing the next successive reflection, due to light refraction. The strips 18 may be formed as an integral part of the reflecting device 12, or with the strips being cemented or otherwise attached permanently over the several reflecting segments 17. Other methods of producing a single image in the viewer may be developed. It will be observed that the walls of the device 12 and the several segments are sufficiently elevated, above the disk 9 as to permit the free and unobstructed traverse of the stylus arm 6 and the angularity of the segments and the transparent strips 18 have been calculated to correctly reflect the images of the cartoons 10.

In the use of the device, the operator selects the desired disk 9 and disposes it upon the turn table 7, after which the reflecting device 12 is engaged over the post 8 and shifted around so that one reflecting segment 17 correctly registers with a cartoon 10, at which time all of the reflecting segments and their transparent strips will be correctly aligned with the several cartoons. The machine is then placed in operation and the stylus engaged with the grooves 11 whereby the recording is reproduced in an audible manner and as the record rotates, the viewer will observe the cartoons being progressively reflected in the segments 17 giving the illusion of a running dog. As clearly shown, the cartoons have been arranged so that the animal assumes four positions of running and effectively produces animation during the playing of the recording. It will be apparent of course that several individuals may view the device at approximate eye level and obtain clear animations from any position about the sound reproducing machine. When the recording has been completely played, the machine may be stopped, the reflecting device 12 lifted therefrom and another recording disposed upon the turn table having an entirely different band of cartoons.

The device as illustrated in FIGURE 5 discloses a reflecting device 12 wherein the several segments 17 are provided with flat reflecting surfaces 19, either formed integral with the device or separately secured to the several segments in any desirable manner. The reflecting surfaces as illustrated in FIGURE 5, while quite effective, do not block out the adjacent reflections and produces to a certain extent distortions of the succeeding images traveling into the line of vision and the reflected images passing beyond the line of vision. However, aside from the distorting images in the adjacent reflecting surfaces, the reflection in that segment directly in line of vision of the viewer will be perfect. The several segments of FIGURE 5 may constitute the outer faces of the segments to be subsequently highly polished. In order to block out the adjacent distorted reflections and concentrate the vision of the viewer on the central image a simple shield 20 with aperture 21 as shown in FIGURE 6 may be used.

It will be apparent from the foregoing that a very novel reflecting device has been provided whereby to impart animation to a circumferential band of cartoons forming an integral part of the recording 9. The device is simple in construction, economical to manufacture and is most effective as an amusement device whereby to impart animation in accordance with a particular recording. The device is quickly and easily installed and offers a very novel form of amusement to children or adults.

It is to be understood that the invention is not limited to the precise arrangement shown, but that changes are contemplated as readily fall within the spirit of the invention as shall be determined by the scope of the subjoined claims.

Having described my invention, what I claim as new and desire to secure by Letters Patent is:

1. An apparatus for use in a sound reproducing machine comprising, a rotated turntable holding a sound record that is rotated therewith, the record having a circumferential succession of pictures on its upper surface, a support mounted above the record and coupled thereto in a manner to cause it to be rotated in company with the record, said support being provided with a circumferential band of inclined flat reflectors arranged inwardly of the pictures, the reflectors converging downwardly, each of said reflectors being provided on its outer surface with a plurality of spaced vertical transparent ribs, said ribs being each substantially rectangular in cross-sectional shape and being operative to obscure images of the pictures other than that which is in radial alignment with a panel under observation.

2. An apparatus for use in a sound-reproducing device comprising the means set forth in claim 1 and wherein the ribs are spaced at uniform distances apart and are of substantially the same cross-sectional rectangular size and shape from top to bottom.

References Cited in the file of this patent

UNITED STATES PATENTS

| | | |
|---|---|---|
| 887,716 | Xander | May 12, 1908 |
| 1,929,173 | Koch | Oct. 3, 1933 |
| 2,561,971 | Bustanoby | July 24, 1951 |
| 2,647,437 | Bentley et al. | Aug. 4, 1953 |
| 2,985,057 | Morgan | May 23, 1961 |

FOREIGN PATENTS

| | | |
|---|---|---|
| 4,244 | Great Britain | of 1877 |
| 11,054 | Great Britain | of 1908 |
| 609,967 | Great Britain | Oct. 8, 1948 |
| 120,484 | France | Aug. 30, 1877 |
| 272,022 | Italy | Feb. 26, 1930 |

OTHER REFERENCES

"Living Pictures," Hopwood, second edition, 1915, published by the Hatton Press, London, England, pages 23–33 of interest, page 33 especially cited.